United States Patent
Baniadam et al.

[15] 3,706,318
[45] Dec. 19, 1972

[54] FLUID COUPLING

[72] Inventors: Mahmood Baniadam, Manhattan Beach; Jorge A. Morando, Burbank, both of Calif.

[73] Assignee: Fairchild Industries, Inc., Germantown, Md.

[22] Filed: March 2, 1971

[21] Appl. No.: 120,286

[52] U.S. Cl..............................137/614.03, 251/149.4
[51] Int. Cl..............................................F16l 37/28
[58] Field of Search.......137/614.02, 614.03, 614.04, 137/614.05, 614.06; 251/149.1, 149.4, 149.6

[56] References Cited

UNITED STATES PATENTS

| | | | |
|---|---|---|---|
| 3,213,884 | 10/1965 | Moyer | 137/614.03 |
| 2,934,359 | 4/1960 | Smisko | 137/614.03 |
| 3,446,245 | 5/1969 | Snyder | 137/614.03 |
| 3,123,099 | 3/1964 | Breuning | 137/614.06 |

FOREIGN PATENTS OR APPLICATIONS

| | | | |
|---|---|---|---|
| 909,561 | 10/1962 | Great Britain | 137/614.02 |

*Primary Examiner*—Martin P. Schwadron
*Attorney*—Michael W. York

[57] ABSTRACT

A fluid coupling with separable male and female coupling members including a threaded connecting member on the male member which advances when rotated to engage a threaded collar on the female member. The axial movement of the advancing connecting member is translated through rollers or studs to a probe which carries a mating sleeve into engagement with a bore in the female coupling member engaging a mating seal and establishing a sealed interface between the male and female coupling members. Continued advancement of the connecting member and the probe results in movement of the sleeve establishing a path of fluid communication between the interior of the mating sleeve and the bore of the female coupling. Further advancement of the connecting member brings the probe into contact with a poppet valve within the female coupling unseating the popped valve and establishing an uninterrupted fluid communication path between the male and female coupling members. Rotation of the actuating sleeve in the opposite direction reverses the action of the components in sequence, first interrupting the fluid flow and entrapping it, then uncoupling the male and female members. The construction of the fluid coupling permits coupling and uncoupling of the members within a fixed space which corresponds to the axial dimension of the coupling.

7 Claims, 6 Drawing Figures

PATENTED DEC 19 1972

INVENTOR.
Mahmood Baniadam
Jorge A. Morando
BY
Michael W. York
Attorney

INVENTOR.
Mahmood Baniadam
Jorge A. Morando
BY Michael W. York
Attorney

FLUID COUPLING

BACKGROUND OF THE INVENTION

Fluid couplings of the self-sealing type are well known in the prior art and have been widely used to couple or uncouple various components that are isolated by such couplings. While assorted prior art couplings of this type have achieved a measure of success insofar as their self-sealing characteristics are concerned, a small amount of leakage of fluid from the system during the coupling or uncoupling process has come to be expected and tolerated.

In addition, the known prior art couplings require some separation or flexibility within the systems in which they are used so that the coupling members can be brought into and out of engagement with each other. This system flexibility is often achieved by the utilization of flexible conduits or joints or by adjusting the relative locations of the components being coupled or uncoupled into or from the system. These procedures are not only cumbersome and time consuming, but introduce strong possibilities that the integrity of the fluid system will be placed in jeopardy. In this connection it should be noted that the system flexibility required by the prior art couplings, whether it be through the use of flexible components or relocation of components, tends to impose fatigue stresses on various parts of the fluid system which can seriously affect their service life.

In certain applications of fluid systems there is frequent need to couple or uncouple fluid components in order to perform maintenance or inspection procedures or when certain components are replaced or systems are to be altered, and the ease and convenience with which this has been accomplished in the prior art has left much to be desired. Moreover, as previously indicated, the frequency with which such service is performed on a fluid system can paradoxically have a deleterious effect on the integrity and reliability and consequently the service life of such a fluid system.

Additionally, the space required to accommodate prior art couplings and their operation is usually larger than one would expect because of the need to provide sufficient area to permit the coupling members to be brought together and joined. In many instances this space requirement imposes severe limitations that must be contended with and usually compromises the design of such fluid systems by the concessions which must be made in the system envelope size, complexity and weight.

Through the medium of the present invention these problems have not only been overcome, but the self-sealing performance characteristics demonstrated during the use of the fluid coupling of the present invention have also been dramatically improved. In addition, the fluid coupling of the present invention may be utilized within the confines of an inflexible fluid system and system envelope.

SUMMARY OF THE INVENTION

This invention relates to fluid couplings and more particularly to fluid couplings of the self-sealing type which can be incorporated in a fluid system and will maintain the fluid integrity of the system when the coupling members are engaged or disengaged.

It is accordingly an object of the present invention to provide a self-sealing fluid coupling that will permit fluid communication to be established or broken between fluid components with ease and reliability.

It is also an object of the present invention to provide a self-sealing fluid coupling that will permit fluid communication to be established or broken between fixed fluid components without the use of flexible members.

It is also an object of the present invention to provide a self-sealing fluid coupling that will permit fluid communication to be established or broken between fixed fluid components without disturbing the fixed position of the components.

It is also an object of the present invention to provide a self-sealing fluid coupling which will automatically permit the flow of fluid from one fluid component to another after the coupling members have been connected.

It is also an object of the present invention to provide a self-sealing fluid coupling employing cooperable valve means within the coupling members to interrupt the flow of fluid between the coupling members to preserve the fluid integrity of the system when the coupling members are disengaged.

It is also an object of the present invention to provide a self-sealing fluid coupling that will permit fluid communication to be established or broken between fluid components which may be readily adapted for use with existing fluid systems.

It is also an object of the present invention to provide a self-sealing fluid coupling that will permit fluid communication to be established or broken between fluid components in a fluid system without the imposition of undue stresses on any part of the fluid system.

The present invention provides a fluid coupling comprising a first coupling member having a fluid passage, a second coupling member having a fluid passage, valve means mounted within the fluid passage of the first coupling member for preventing leakage of fluid from the first coupling member when the second coupling member is uncoupled from the first coupling member, probe means movably mounted in the second coupling member, and connecting means movably mounted on the second coupling member for connecting the second coupling member to the first coupling member. The connecting means is operatively connected to the probe means and is adapted to move the probe means axially with respect to the second coupling member to open the valve means in the first coupling member when the connecting means is moved to connect the second coupling member to the first coupling member. The connecting means is also adapted to move the probe means axially with respect to the second coupling member to permit the valve means in the first coupling member to close when the connecting means is moved to uncouple the second coupling member from the first coupling member. The connecting means is operatively connected to the probe means by interconnecting means which can include a roller or a stud.

BRIEF DESCRIPTION OF THE DRAWINGS

The invention will be hereinafter more fully described with reference to the accompanying drawings in which.

DETAILED DESCRIPTION OF THE PREFERRED EMBODIMENT

Figure 1:
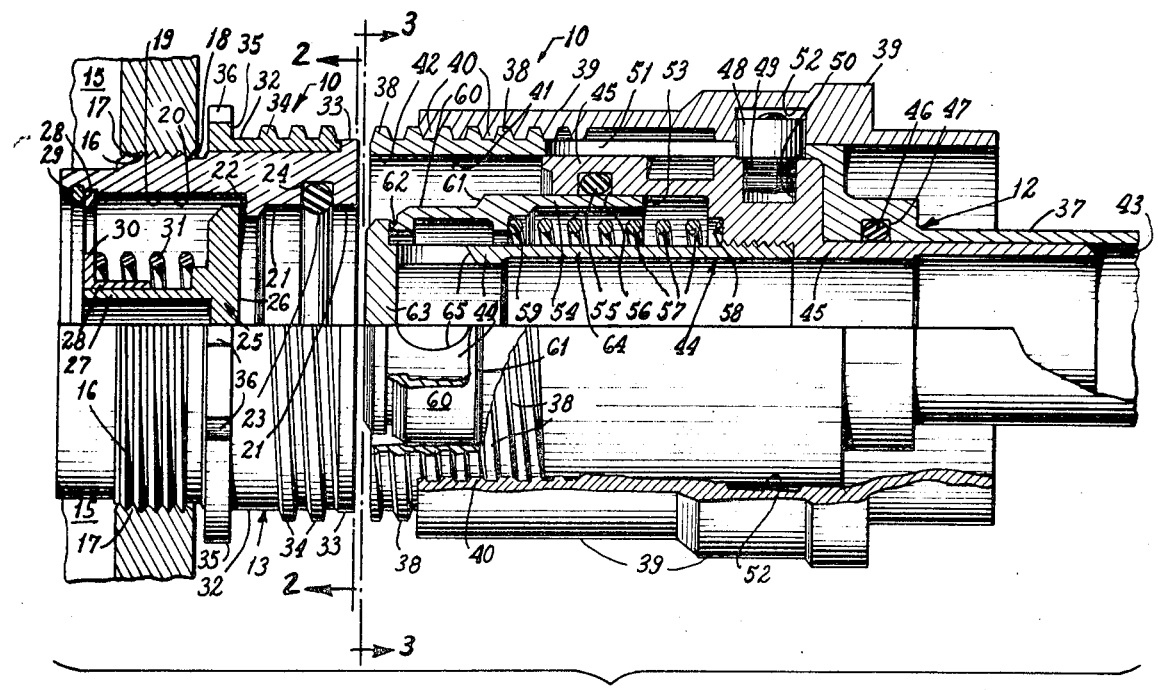
FIG. 1 is an elevational view, partly in section, of the coupling of the present invention showing its two coupling members and associated components, disconnected and slightly spaced apart, but in position to be coupled to one another.

If reference is made to FIGS. 1 through 5 in the drawings, it will be noted that the coupling device of the present invention is generally designated by the number 10 and comprises two major component members of generally tubular configuration, which will hereinafter be referred to as the second or male coupling member 12 and the first or female coupling member 13. The female coupling member 13 is, in the arrangements to be described herein, adapted to be associated with a fluid pressure container 15 and is secured thereto by a plurality of fluid tight threads 16 provided about the circumference of one end of the female member 13. These threads 16 cooperate with a plurality of mating threads 17, situated on the inner surface of an axial bore 18 that is in communication with a source of fluid under pressure in the container 15.

The tubular female coupling member 13 has a fluid passage or a bore 19 whose long axis coincides with the long axis of the female coupling member. The bore 19 varies in its diameter according to variations in the wall thickness of the female coupling 13 along the coupling's axial length. In this connection, the cross sectional area or wall thickness of the female member 13 is increased in that section of the female coupling that protrudes from the fluid container 15 in the direction of the male coupling member 12, as can best be seen in FIGS. 1, 4 and 5. As the cross section or wall thickness in this area is increased, the bore size is reduced so that female coupling member 13 is equipped with two distinct diameter bore sections, the larger of the two being designated by the number 20, and the smaller designated by the number 21.

A step or annular shoulder is present between the bore sections 20 and 21 and forms a valve seating surface 22. The reduced bore diameter section 21 of the female coupling member 13 has a 0-ring seal 23 that is accommodated within a suitable circumferential groove 24 provided in the inner wall of the bore section 21 near the end of the female coupling member 13 that faces the male coupling member 12. This 0-ring seal serves as a mating seal in that it is adapted to cooperate with elements of the male coupling member 12, as will hereinafter be described in greater detail.

Figure 2:
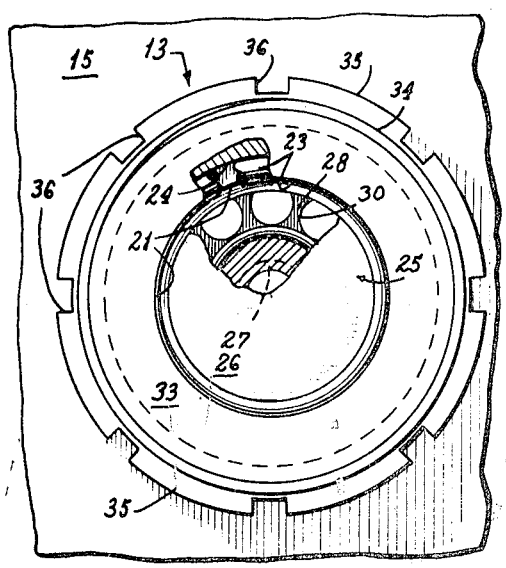
FIG. 2 is an end view of one member of the fluid coupling and its components, taken on the line 2—2 of FIG. 1 and viewed in the direction of the arrows, with certain parts broken away for purposes of clarity.
Figure 3:
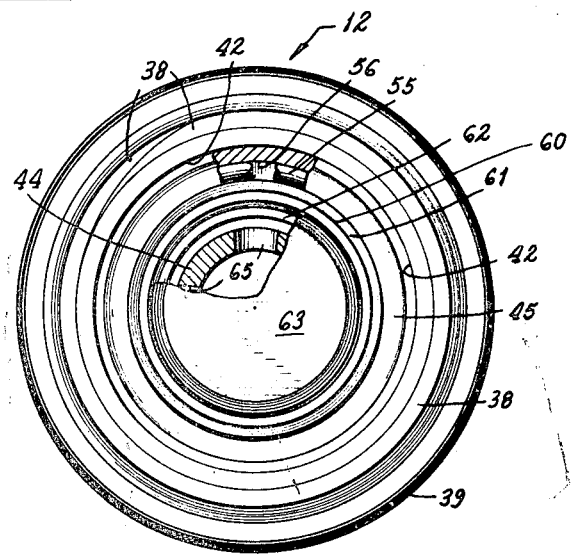
FIG. 3 is an end view of one member of the fluid coupling and its components, taken on the line 3—3 of FIG. 1 and viewed in the direction of the arrows, with certain parts partially broken away for clarity.

Valve means comprising a poppet valve 25 for preventing leakage of fluid from the female coupling member when the male coupling member is uncoupled from the female coupling member is mounted within the bore section 20 of the female coupling member 13 and comprises a poppet head 26 formed at the end of a hollow tubular member 27, which is capable of reciprocal movement within a valve supporting bearing and spring retainer 28, that is positioned within the bore section 20 of the female coupling member 13 by means of a locking ring 29 that fits within the end of the bore section and rests against the outer circumferential surface of the spring retainer. The valve support bearing and spring retainer 28 is provided with several apertures 30 located radially with respect to its centerline, as best seen in FIGS. 1 and 2 of the drawings, to permit the flow of fluid from the container 15 into the bore 19 of the female coupling 13. A compression spring 31 is disposed around the hollow tubular member 27 of the poppet valve 25 and exerts a spring force between the fixed spring retainer 28 and poppet valve head 26, thereby urging the poppet valve head against the valve seating surface 22 on the shoulder in the bore 19 of the female coupling member 13.

It should be noted that the poppet valve 25 with its comparatively large diameter poppet valve head 26 and hollow tube 27 allows a considerable surface area to be exposed to the pressure of fluid communicated through the bore section 20 from the container 15. This permits fluid pressure to exert itself against the poppet valve 25 in cooperation with the spring force generated by the compression spring 31. These combined forces assure a positive seal between the poppet valve head 26 and the sealing surface 22, unless acted upon by components of the male coupling member 12, as will hereinafter be described in detail. This sealing engagement between the poppet valve head 26 and the shoulder sealing surface 22 in the female coupling effectively isolates the fluid communicated from the container 15 to bore section 20, preventing the leakage of fluid therefrom.

As heretofore described, the female coupling member 13 protrudes from the fluid container 15 and the female coupling member has a circular collar 32, which is rotatable and is restrained against axial movement by the fluid container 15 on one side and a retaining lip 33 situated at the end of the coupling member 13 that lies furthermost from the container. The collar 32 is equipped with relatively coarse spiral threads 34 on its outer surface which facilitate the engagement of the male and female members 12 and 13 respectively in a manner to be hereinafter described. The collar 32 is provided with a holding flange 35 having several serrations 36 in its outer surface which may be grasped by a spanner wrench (not shown) to restrain the collar from rotation during the coupling or uncoupling process. This arrangement, wherein the collar 32 is rotatably mounted provides several advantages in that it permits better thread alignment with a mating thread to be hereinafter described, and eliminates any possibility of disturbing the threaded relationship of the female coupling 13 and the fluid container 15, when the coupling members 12 and 13 are joined.

The male coupling member 12 has a reduced diameter end section 37 which may be connected to the end of a fluid conduit (not shown) or any other apparatus that may have to be connected to or disconnected from a fluid system, bearing in mind that a primary advantage of these proposed arrangements lies in the fact that there is no protrusion of the internal parts of the coupling 10 and therefore, there need be no axial line flexibility required to engage or disengage the coupling members 12 and 13 when they form part of a fluid system.

The portion of the male coupling member 12 that is adapted to be situated adjacent to the female coupling member 13 is complimentary thereto in that its outer circumference is the same as the outer circumference of the collar 32 and is provided with similar coarse spiral threads 38 arranged in such a manner as to be a continuation of the thread pattern of the spiral threads 34 on the previously described collar 32 of the female coupling member 13. Connecting means for connecting the male coupling member 12 to the female coupling member 13 comprising a generally tubular shaped member 39 surrounds and is movably mounted at the end of the male coupling member 12 that is adapted to be situated adjacent to the female coupling 13 and the tubular shaped member is equipped with similar coarse spiral threads 40, situated on its interior circumference which are in continuous mesh with the spiral threads 38 of the male coupling member 12 and are adapted to engage the similar threads 34 on the collar 32 of the female member 13 as the coupling members 12 and 13 are connected.

The male coupling member 12, as heretoforenoted, has a generally tubular configuration and it has two distinct diameter bore sections forming a fluid passage designated generally by the number 41 with the larger diameter bore section 42 being situated immediately adjacent to the female coupling 13 to accommodate several reciprocable components which operate therein during the coupling or uncoupling process. As will be noted in the drawings, a smaller diameter bore section 43 is located at end of the male coupling member 12 away from the female coupling and its diameter may conform with the diameter of a fluid conduit or apparatus (not shown) to which it should be attached.

Probe means designated generally be the number 44 is located within the bore 41 of the male coupling member 12 and comprises a reciprocable probe body member 45 which also is of generally tubular configuration and is movably mounted in the bore of the male coupling member. The shape and diameters of the probe body member 45 are generally complimentary to the varying diameters of the bore of the male coupling member 12, and an 0-ring seal 46 carried in a groove 47 in the bore of the reduced diameter end section 37 is provided to cooperate with the complimentary surface of the probe body member 45 to prevent any seepage of fluid from between the complimentary surface of the probe body member and the bore of the end section.

The reciprocable probe body member 45 is actuated by means of the aforementioned connecting member 39 through a plurality of radially extending rollers 48 which are connected to the probe means by being rotatably mounted on stub shafts 49, which extend radially from the probe body member 45 and are threaded in sockets 50 that are provided in the probe body member. These rollers 48 extend radially outward, through slots 51, which extend axially in the wall of the male coupling member 12 and are accomodated within a circumferential groove 52 provided in the interior surface of the connecting member 39. In this manner, the rollers 48 are drivingly engaged with the walls of the circumferential groove 52 situated in the connecting member 39 and serve to connect the connecting member to the probe body member 45 of the probe means 44. The rollers 48 also serve as means to prevent rotation of the probe means 44 since they extend through the slots 51 in the wall of the male coupling member 12.

The connecting member 39 is adapted to be rotated when the coupling members 12 and 13 are to be engaged or disengaged and it is obvious that as this is done its spiral threads 40 engage the spiral threads 38 on the exterior surface of the male coupling member 12 causing the connecting member 39 and its associated parts to move in an axial direction, and to advance toward or retract from the female coupling member 13, depending upon the direction of rotation of the connecting member. Accordingly, the rollers 48, by means of their relationship with the side walls of the groove 52, will be rotated about their stub shafts and move in the slots 51 in the wall of the male coupling member 12 and as the connecting member 39 moves in an axial direction, this axial movement is translated by the rollers 48 through the stub shafts 49 to move the probe body member 45 in the same axial direction.

The probe body member 45 has a sizeable bore 53 which extends in the direction of the female coupling 13, to accommodate valve means forming part of the probe means 44 that comprises a hollow mating sleeve 54 mounted and capable of relative axial movement thereon. As in the case of probe body member 45 and the end section 37, the diameter of that part of the mating sleeve 54 situated within the bore 53 of probe body member 45 is complimentary thereto. An 0-ring seal 55 is situated in a groove 56 provided within the bore 53 of the probe body member 45 and provides a seal between the members preventing fluid, in communication with the interiors of the mating sleeve 54 and the probe body member from escaping therebetween.

A compression spring 57 is situated within the hollow mating sleeve 54, one end of which is seated against a shoulder 58 that is provided within the bore 53 of the probe body member 45 for that purpose. The opposite end of the compression spring 57 bears against a similar shoulder 59 provided within the hollow mating sleeve 54, thereby exerting a spring force tending to separate the probe body member 45 and the mating sleeve 54 in an axial direction. As will be noted in the drawings, the end of the mating sleeve 54 in closest proximity to the female coupling member 13 is provided with a reduced diameter section 60 that is adapted to be received within the bore 21 of the female coupling member 13 when the male and female members 12 and 13 are brought together. This reduced diameter section 60 also cooperates with the aforementioned 0-ring seal 23 in the female bore 21 when the mating sleeve 54 is in its coupled position, to provide a fluid tight connection in a manner which will be described hereinafter in greater detail.

A shoulder 61 is created by the two varying exterior diameters of the sleeve 54, and it serves to limit the extent to which the sleeve 54 can be accommodated within the female coupling bore 21 when the coupling members 12 and 13 are brought into engagement. When the coupling members are brought together, the shoulder 61 abuts the end of female coupling member 13 at the perimeter of the entrance to the bore 21, firmly seating the mating sleeve 54 against the end of the female coupling member 13.

A lip 62 is provided at the end of the mating sleeve 54 which is nearest the female coupling 13. This lip serves as a seat for a poppet head 63 which is situated at and forms an integral part of the furthermost extremity of a hollow tubular member 64, which is located concentrically to and within the aforementioned mating sleeve 54, probe body member 45, male coupling member 12 and the connecting member 39. This hollow tubular member 64 is threadably connected to the probe body member 45 at the end opposite the poppet head and effectively becomes an extension thereof and the poppet head 63 and the connected tubular member 64 form part of the probe means 44. A plurality of apertures 65 are provided in the tubular member 64 immediately adjacent to the poppet 63 to permit fluid to communicate between the interior of tubular member 64 and the interior of the mating sleeve 54. When the poppet 63 is seated against the lip 62 of the mating sleeve 54, which occurs when the female and male coupling members are uncoupled, fluid that is communicated to the interior of the tubular member 64 from the fluid component associated with the male coupling member 12, will be sealed within the fluid tight chamber created by the sealing engagement of the poppet 63 and the lip 62 and by means of the previously described relationship of the 0-rings 55 and 46, and the respective mating sleeve 54 and the probe body member 45. Thus the resiliently biased sleeve 54 of the probe valve means prevents leakage of fluid from the male coupling member 12 when the male coupling member is uncoupled from the female coupling member 13.

Figure 4:
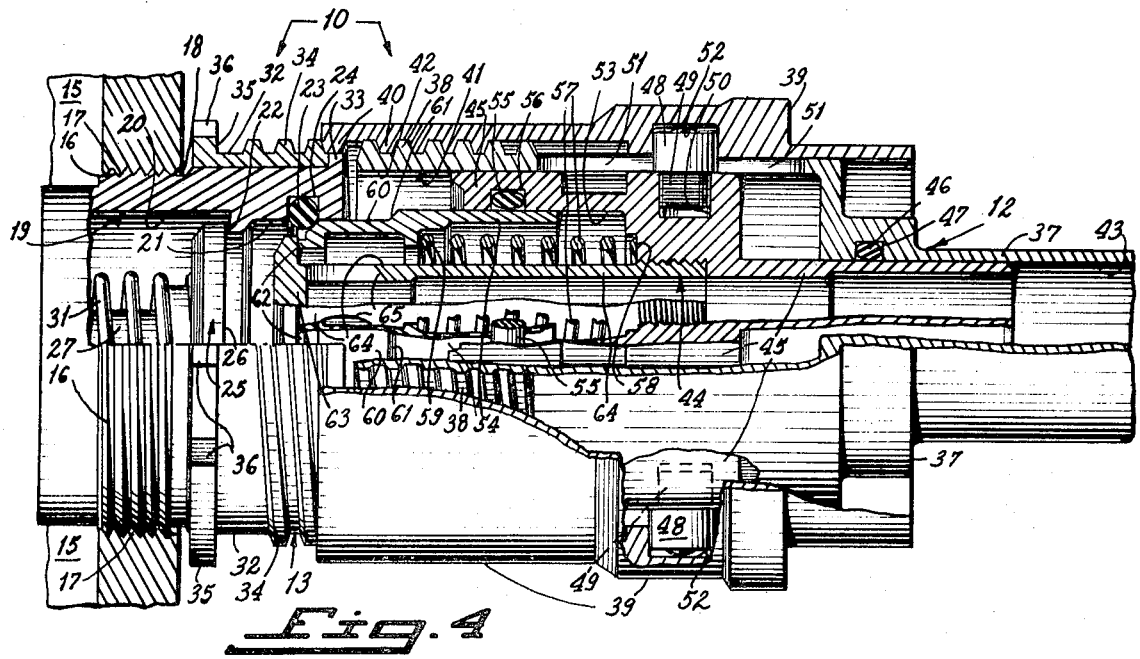
FIG. 4 is an elevational view, partly in section, of both coupling members of the fluid coupling and associated components, according to the present invention, in an intermediate position showing the coupling members as they would appear as they are being connected or disconnected.
Figure 5:
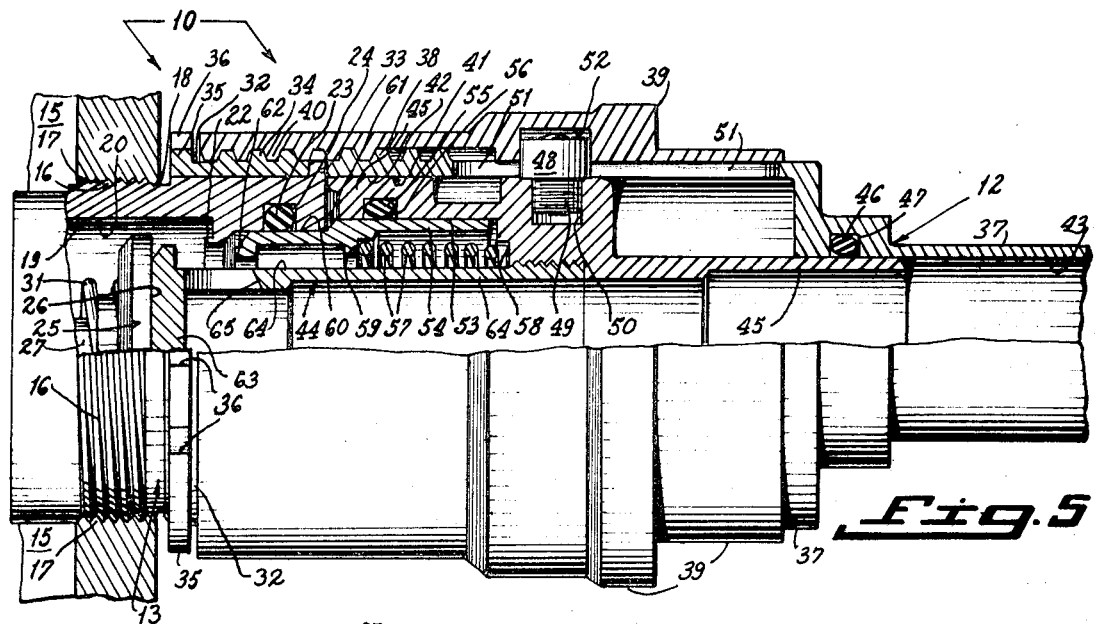
FIG. 5 is an elevational view, partly in section, of a fluid coupling according to the present invention, showing the coupling members and their components in the fully connected or coupled position.

It should be noted that thus far the coupling components according to the present invention, have generally been described in their unconnected position and it is suggested that specific reference be made to FIGS. 4 and 5 of the drawings, as well as FIG. 1, for a comparative graphic illustration of the relationship of these components in an intermediate and fully engaged and coupled position.

To connect the male and female members 12 and 13, the connecting member 39 is rotated so that its spiral threads 40 will advance over the spiral threads 38 on the male coupling member 12. Rotation of the connecting member 39 in this manner will also move the connecting member in an axial direction toward the female coupling member 13 and this axial movement is translated to the rollers 48 situated in the groove 52 that is provided in the connecting member 39. As the member 39 is rotated, the rollers 48 are caused to rotate on the stub shafts 49 by the frictional engagement of the rollers with the side wall of the groove 52, so that the advancement of the connecting member 39 and the rollers 48 that also ride in the slots 51 in the male coupling member 12 is accomplished in a smooth and efficient manner.

As previously described, the stub shafts 49 which support the rollers 48 are fixed to the probe body member 45 so that as the connecting member 39 is moved axially, the probe body member 45 will be moved accordingly in the same direction. Consequently, the hollow tubular member 64 which is supported at one end by the probe body member 45 and which acts as a conduit for the fluid in the system and also supports the poppet 63 will likewise be moved in an axial direction toward the female coupling member 13 as the probe body member 45 is so moved.

The aforementioned mating sleeve 54, as indicated previously, is supported within the bore 53 of the probe body member 45 and through the medium of the compression spring 57, the sleeve will likewise be moved in an axial direction, maintaining the sealing relationship between the lip 62 thereon and the poppet 63. As the connecting member 39 is continually rotated, its spiral threads 40 will engage the spiral threads 34 of the collar 32 of the female coupling member 13. The poppet 63, together with the reduced diameter end section 60 of sleeve 54 will then enter the bore 21 of the female coupling 13 until the shoulder 61 abuts the end of the female coupling member at the periphery of the opening to the bore 21, whereupon the sleeve 54 of the probe means will have reached its maximum axial travel and be fully sealingly engaged with the bore 21 of female coupling member 13 prior to the opening of the poppet valve head 26 of the valve means within the female coupling member. In this position, the 0-ring 23 in bore 21 of female coupling member 13 cooperates with the reduced diameter section 60 of the mating sleeve 54 of the probe means, thereby providing an effective and highly efficient seal between the reduced diameter section of the mating sleeve and the bore of the female coupling member. As rotation of the connecting member 39 continues and more of the spiral threads 40 thereon engage the threads 34 situated on the collar 32, axial movement of all of the male coupling components except the already seated mating sleeve 54 will continue. Relative motion between the seated mating sleeve 54 and the probe body member 45, attached tubular member 64 and poppet 63 is facilitated by the resilient spring 57 which is placed under increased compression as the probe body member 45, tubular member 64, and poppet 63 continue to move in an axial direction toward the female coupling member.

It should be noted that the increased spring force applied to the seated sleeve 54 as the connecting member 39 is rotated increases its resistance against any unseating influences that may come about from exposure to the flow of fluid within the members 12 and 13 when they are engaged. The continued axial movement of the components of the probe means 44 causes the poppet 63 to progressively move away from the lip 62 of the seated mating sleeve 54, increasing its penetration of the female coupling. As the poppet 63 of the male coupling member 12 abuts the female poppet head 26, it pushes the poppet head against the spring 31, thereby moving the poppet head away from its sealing relationship with its shoulder seating surface 22 in the female coupling member 13 until the poppet head reaches the fully open position, as shown in FIG. 5 of the drawings. Thus it is apparent that the connecting means which comprises the connecting member 39 is operatively connected to the probe means 44 and is adapted to move the probe means axially with respect to the male coupling member 12 to open the valve means in the female coupling member 13 when the connecting means is moved to connect the male coupling member to the female coupling member. In this connected condition, a fluid path is established between the fluid container 15, around the poppets 25 and 63, into the interior of mating sleeve 54, through the apertures 65 to the interior of the tubular member 64 and the end section 37, so that fluid communication is established between the container 15 and any fluid conduit or apparatus to which the male coupling 12 may be attached.

As illustrated in FIG. 5 of the drawings, when the male and female coupling members 12 and 13 are fully connected, the spiral threads 40 on the connecting member 39 will have engaged all of the mating threads 34 on the collar 32. As previously described, the collar 32 is equipped with a holding flange having serrations 36 which will accommodate a spanner wrench (not shown) to hold the collar 32 as the connecting member 39 is tightened to lock the male and female coupling members 12 and 13 together. It should be noted that the aforementioned collar retaining lip 33 on the female coupling member 13 assists in the distribution of any locking forces between the coupling members.

In order to disconnect the coupling members 12 and 13, the connecting member 39 is rotated in the opposite direction, while the collar 32 on the female coupling member is held stationary so that the spiral threads 34 on the collar and the spiral threads 40 on the connecting member 39 are progressively disengaged. This, of course, results in the axial movement of the connecting member 39 and the probe body member 45, the tubular member 64 and the poppet 63 of the probe means 44 in a direction away from the female coupling member. This axial movement causes the poppet 63 to relax its butting engagement with the poppet head 26 in the female coupling member, permitting the spring 31 to co-act with the fluid pressure exerted against the female poppet valve 25 to push the female poppet head outward and to bring the female poppet head 26 into a sealing engagement with its valve seat surface 22 within the bore 19 in the female coupling member 13. In this manner, the fluid communicated from the fluid container into the female coupling member 13 is sealed, within the female coupling member, as the male and female coupling members are being separated.

Continued rotation of the connecting member 39 continues the withdrawal of the male poppet 63 from the female bore 21 into the male coupling member 12 and brings the male poppet into sealing engagement with the lip 62 on the mating sleeve 54, thereby trapping fluid within the mating sleeve 54, the tubular member 64, the end section 37 and the associated connected fluid component which is not shown. It is obvious that during this axial movement, the spring 57 exerts a separating force between the mating sleeve 54 and the probe body section 45 as the probe means 44 is continually moved in an axial direction away from the female coupling member 13, and this force decreases as the probe means is moved away from the female coupling member. However, sufficient spring pressure is exerted by the spring 57 upon the mating sleeve 54 to assure the sealing engagement of its lip 62 with the male poppet 63 when the male coupling member 12 is in its fully disengaged position. From the foregoing, it is apparent that the connecting member 39 of the connecting means is adapted to move the probe means 44 axially with respect to the male coupling member 12 to permit the valve means in the female coupling member to close when the connecting member is moved to uncouple the male coupling member from the female coupling member.

Figure 6:
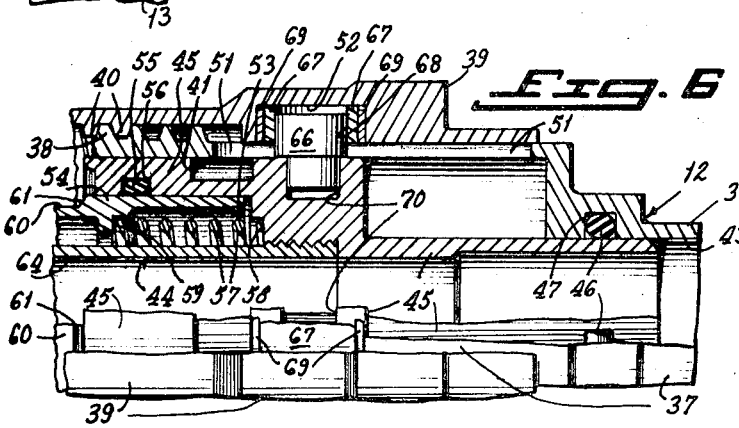
FIG. 6 is a fragmentary elevational view partly in section showing an alternative embodiment of the invention.

Reference should be made to FIG. 6 in the drawings which illustrated an alternative embodiment of the invention which utilizes one or more studs 66, one of which is illustrated, in place of the aforementioned rollers 48 and stub shafts 49. In this embodiment an annular ring 67 is disposed within the circumferential groove 52 in the interior surface of the connecting member 39, and the annular ring is provided with one or more radial apertures 68 to receive the stud or studs 66. The annular ring 67 is supported axially in the groove 52 by means of the thrust washers 69 that are situated on each side of the annular ring 67, between the ring and the adjacent sidewalls of circumferential groove 52. These thrust washers may be formed of a low friction material as polyamide, to provide low friction bearing surfaces that will perform satisfactorily without binding or undue wear under substantial loads that might be imposed when the fluid coupling is utilized in high pressure systems.

As illustrated in FIG. 6 each stud 66 extends through the axial slot 51 in the male coupling member 12 and the lower portion of the stud is disposed within a radial groove 70 provided in the circumferential surface of the probe body member 45. In view of this arrangement, as the connecting member 39 is rotated and moved in a axial direction by means of the cooperative relationship of the spiral threads 38 and 40 in the manner previously described, the axial force is transmitted from the sidewalls, of the groove 52, through one of the thrust washers 69 to the annular ring 67. The stud 66 or studs that are mounted in the aperture 68 or apertures in the ring 67 are likewise moved in an axial direction, and by virtue of the operative engagement between the stud 66 or studs and groove 70 in the probe body member 45, the probe body member will be moved in a corresponding axial direction.

As heretofore mentioned, this alternative arrangement is well suited for use in high pressure fluid systems where considerable connecting forces would be required and where there might otherwise be a tendency for the components to experience undue wear under the severe loads thereby imposed.

It should be borne in mind that the self-sealing performance characteristics of the fluid coupling described herein have been remarkably improved over the known prior art types, due primarily to the sequence of operation of the related components, as well as the sealing interfaces which have been provided between them. During every phase of the coupling operations just described, the fluid is trapped within the sealed chambers of the coupling members, or when engaged, within the fluid system.

From the foregoing description, it is significant to note that the coupling of the present invention may be used to connect or disconnect fluid components within the confines of its own axial dimensions. That is to say, the fluid coupling herein described may be utilized to engage so called "hard mounted" fluid components that are incapable of movement relative to each other, or where the use of flexible connecting members would be inappropriate.

Although the invention has been described with reference to certain preferred embodiments, it should be understood that many variations and modifications may be made without departing from the spirit and scope of the invention as defined in the appended claims.

What is claimed is:

1. A fluid coupling comprising a first coupling member having a fluid passage, a second coupling member having a fluid passage, valve means mounted within the fluid passage of said first coupling member for preventing leakage of fluid from said first coupling member when said second coupling member is uncoupled from said first coupling member, probe means movably mounted in said second coupling member, at least one roller rotatably mounted on said probe means and connecting means movably mounted on said second coupling member for connecting said second coupling member to said first coupling member, said connecting means having a groove for receiving at least a portion of said roller and being operatively connected to said probe means by said roller to effect axial movement of said probe means with respect to said second coupling member to open said valve means in the fluid passage of said first coupling member when said connecting means is moved to connect said second coupling member to said first coupling member and to effect axial movement of said probe means with respect to said second coupling member to permit said valve means in the fluid passage of said first coupling member to close when said connecting means is moved to uncouple said second coupling member from said first coupling member.

2. The fluid coupling of claim 1 wherein said second coupling member has at least one longitudinal extending slot in its wall and at least a portion of said roller rides in said slot.

3. A fluid coupling comprising a first coupling member having a fluid passage, said first coupling member having first connecting means with external threads located thereon, a second coupling member having a fluid passage, said second coupling member having external threads which match the external threads on said first connecting means, valve means mounted within the fluid passage of said first coupling member for preventing leakage of fluid from said first coupling member when said second coupling member is uncoupled from said first coupling member, probe means movably mounted in the fluid passage of said second coupling member and having a fluid passage communicating with the fluid passage of said second coupling member, said probe means having means for opening the valve means in the fluid passage of said first coupling member and means for sealing the fluid passage of said first coupling member prior to the opening of the valve means in the fluid passage of said first coupling member and for preventing leakage of fluid from the fluid passage of said probe means prior to the opening of the valve means mounted within the fluid passage of said first coupling member, second connecting means rotatably mounted on the exterior of said second coupling member, said second connecting means being movable axially with respect to said second coupling member and having threads which engage the threads located on the exterior of said second coupling member and are adapted to engage the threads of said first connecting means to couple said second coupling member to said first coupling member, and interconnecting means operatively interconnecting said second connecting means and said probe means for moving said probe means axially with respect to said second coupling member to cause said probe means to open the valve means in the fluid passage of said first coupling member when said second connecting means is moved to couple said second coupling member to said first member and for moving said probe means axially with respect to said second coupling member to cause said probe means to permit the valve means in the fluid passage of said first coupling member to close when said second connecting means is moved to uncouple said second coupling member from said first coupling member.

4. The fluid coupling of claim 3 wherein said interconnecting means comprises at least one stud extending radially outward from said probe means and wherein said second connecting means has a circumferential groove for receiving a portion of said stud and said second coupling member has a longitudinal slot in its wall for slidably receiving a portion of said stud.

5. The fluid coupling of claim 4 wherein said means for sealing the fluid passage of said first coupling member and for preventing leakage of fluid from the fluid passage of said probe means comprises a resiliently biased sleeve.

6. The fluid coupling of claim 4 further comprising an annular ring having an aperture for receiving said stud located in the circumferential groove of said second connecting means.

7. The fluid coupling of claim 6 further comprising a thrust washer situated on each side of said annular ring between said ring and the adjacent sidewall of the circumferential groove of said second connecting means.

* * * * *